March 18, 1969 N. R. MIGDOL ET AL 3,433,700
CELLULAR FOAM COMPOSITION AND PROCESS FOR ITS PREPARATION
Filed June 22, 1964
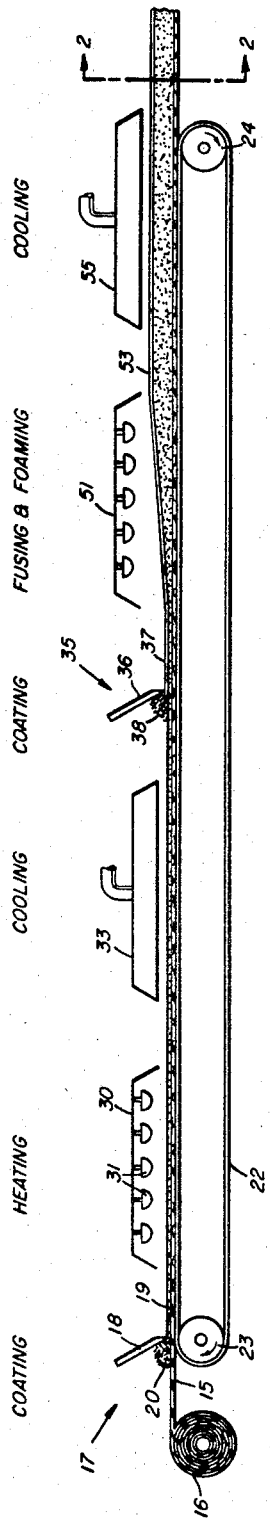
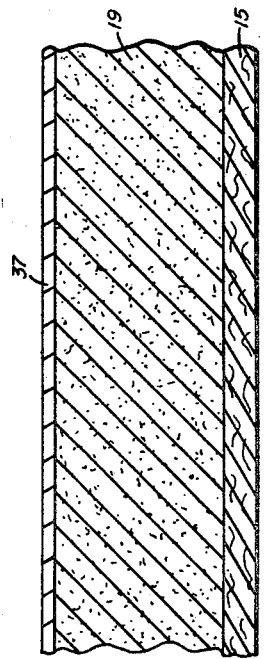
INVENTORS.
JOHN BISKUP
NORMAN R. MIGDOL
BY
ATTORNEY

United States Patent Office 3,433,700
Patented Mar. 18, 1969

---

3,433,700
CELLULAR FOAM COMPOSITION AND PROCESS FOR ITS PREPARATION
Norman R. Migdol, 7 Spoganetz Ave., Carteret, N.J. 07008, and John Biskup, 77 Center Ave., Chatham, N.J. 07928
Filed June 22, 1964, Ser. No. 377,136
U.S. Cl. 161—160            15 Claims
Int. Cl. B32b 3/26, 5/20

---

ABSTRACT OF THE DISCLOSURE

The invention relates to a laminate and to the process for its preparation, having a high degree of recovery from indentation by heavy loads. The laminate comprises a solid vinyl chloride polymer composition which forms the wear layer and a cellular vinyl chloride polymer composition layer bonded to the wear layer. The cellular foam layer contains three to fifteen parts of synthetic rubber for each 100 parts of vinyl chloride polymer. The laminate is prepared by applying a coating of polyvinylchloride composition to a web, heating to gel the coating, applying a second coating over the first coating and then heating to fuse the compositions and decompose the blowing agent contained in one of the coating compositions.

---

This invention relates to flexible, decorative plastic sheets and particularly to such products having a resilient cellular foam layer and a solid vinyl composition wear layer.

Printed products adaptable as decorative and protective coverings for floors, walls and the like have been available for many years. The technique of printing on a flexible backing sheet with an oleoresinous enamel paint decoration was one of the first procedures used commercially to produce products commonly referred to as printed felt base. Such products can be readily manufactured in a variety of attractive designs and are low in cost. Printed felt base has a had, smooth decorative wearing surface. Although this renders the product easily cleaned, the hard surface tends to result in excessive noise from foot traffic. In addition, the hard surface can cause fatigue to those who must stand for long periods of time upon such products. The comfort and quietness of conventional printed felt base is somewhat better than floors of wood and stone due to the cushioning characteristics of the felt backing, but since the felt layer is relatively thin and on the back of the product, the improvement is only slight. Also, the thin product lacks any appreciable resistance to the flow of heat with the result that printed felt base covered floors tend to be cold, an effect augmented by the smooth and glossy wearing surface.

United States Patent 2,943,949, issued July 5, 1960, to Robert K. Petry, discloses a product having a textured surface and the resiliency of soft surface covering such as tufted carpets while still retaining the unitary readily cleanable surface of printed felt base. This product is produced by coating or printing a foamable thermoplastic resinous composition on a textured backing such as an embossed flooring felt and then heating to fuse and foam the composition. The surface covering produced has a three-dimensional appearance, simulating a carpet, caused by the embossing being reproduced in reverse in the surface and a very resilient nature caused by the foam. Since the product has a solid surface, it has the ease of cleaning attribute of printed felt base.

One of the most sought after properties of resinous composition floor covering is good indent recovery. If a floor covering has poor indent recovery, it quickly becomes covered with permanent, small concave impressions from heels and the like causing rapid deterioration in its appearance. A resinous cellular foam layer should have good indent recovery because of its resilient nature. The indent recovery of a resinous cellular foam layer, however, is poor when a solid layer of resinous composition is placed on top of the foam layer to increase its useful life. The reason for this is not fully understood, but the solid layer offers substantial resistance to indent recovery. Recovery from indent is a major problem when the solid wear layer has a thickness greater than 0.008 inch.

An object of the invention is to produce a decorative surface covering characterized by excellent indent recovery and comfort underfoot while having good wear resistance. Another object of the invention is to provide a process for producing such a product in a simple and economical manner. A further object of the invention is to provide a resinous cellular foam composition having a high resistance to permanent indentation. Other objects and the advantages of the invention will appear hereinafter.

In accordance with the invention, a surface covering having a solid vinyl chloride polymer composition wear layer laminated to a cellular foam layer having a high degree of indent recovery is produced by forming the foam layer from a vinyl chloride polymer plastisol composition containing about 3 to 15 parts, and preferably 5 to 10 parts, per 100 parts of vinyl chloride polymer of a synthetic rubber elastomer uniformly dispersed in the composition and an organic blowing agent. The amount of synthetic rubber is critical to obtain a product having a high indent recovery. Surface coverings can be prepared utilizing this composition by a number of methods. A typical method involves coating a flexible backing with the composition containing a blowing agent, heating the coating to at least partially gel the composition, applying a wear layer second coating of thermoplastic resinous composition of substantial thickness over the gelled coating thereby completely covering the foamable coating and heating to fuse the coating compositions and foam the coating to form a structure having a solid, unfoamed surface layer of substantial thickness and a cellular interlayer. Another method involves the printing or otherwise applying a decoration on the surface of the gelled sheet followed by the application of a transparent wear layer. The wear layer can be applied after heating to decompose the blowing agent and form the cellular layer as a coating or a preformed sheet. If a backing web is utilized in the formation of the product, it can be removed or it can remain a part of the final product.

It is preferred that the compositions of the foam layer and wear layer come within defined limits to give the product an acceptable combination of indent recovery and cushioning. It has been discovered that the thickness of the foam layer should be from about 0.020 inch to about 0.100 inch. If a solid wear layer is utilized, it is preferably at least 0.003 inch and up to about 0.030 inch thick. Additionally, the ratio of plasticizer to resin in each layer must come within defined limits hereinafter described.

The invention will be better understood from the following detailed description of one embodiment of the invention when read in conjunction with the drawings wherein—

FIGURE 1 is a schematic representation of a method of producing a surface covering in accordance with the present invention; and FIGURE 2 is an enlarged cross-sectional view of one form of the product produced by the method of FIGURE 1.

With reference to FIGURE 1, a backing web 15, which can be a felted fibrous backing material or a paper sheet coated with a release agent is supplied from roll 16 and passed onto an endless conveyor belt 22 which is driven by wheels 23 and 24. The conveyor passes the sheet through a coating apparatus generally indicated at 17. The coating apparatus can comprise a doctor blade 18 which allows a uniform layer of the vinyl chloride polymer composition 19 containing a blowing agent to be applied to the surface of the web 15 from a reservoir 20 of the composition as it passes beneath the blade. The coated web is carried by the endless belt 22 to an oven 30 provided with any suitable heating means such as infrared heat lamps 31. The oven supplies sufficient heat to the resinous composition to gel or partially gel the composition without decomposing the blowing agent contained in the composition. The composition which is a gelled solid is then passed through a cooling chamber 33. The sheet is cooled to a sufficiently low temperature so as not to interfere with subsequent coating operation. If desired, at this point, a decorative design can be printed on the surface of the gelled coating. The printing of the design can be accomplished by any of the usual printing techniques but the rotogravure method is preferred. The cooled coated felt is then conveyed to a second coating apparatus, generally indicated at 35, for applying a wear resistant coating 37 to the surface of the product. The coating apparatus can be any conventional coating means such as a reverse roll coater or a doctor blade 36 which applies the thin coating 37 from a reservoir 38 of resinous composition maintained back of the doctor blade. The sheet is then passed through an oven 51 in which the composition is fused and foamed by the decomposition of the blowing agent, thereby producing a decorative foamed product 53. The product is withdrawn from the oven and passed through a cooling chamber 55. The cooled sheet can then be stripped from the backing web or the web can remain an integral part of the final product. The product can be used in sheet form as produced or can be cut up into tiles or other appropriate shapes depending on its ultimate use.

As an alternate method, the solid coating which will form the wear layer of the product can be first applied to the surface of a release paper. The wear layer coating is then heated to gel the composition and the foamable coating is applied over the surface of the gelled wear layer over the design. After fusing the two coatings and forming the composition, the product is stripped from the release paper and inverted for use.

As indicated, backing webs can be used which are subsequently stripped from the final product, such as strippable coated release paper or the like. A paper having a coating such as disclosed in United States Patent 2,273,040, which issued on Feb. 17, 1942, is particularly suitable as a release paper. If the product is to be used in sheet form, rigid backings can be used, such as a metal sheet of aluminum or steel, rigid sheets of resinous material, such as rigid polyvinyl chloride sheets, and the like. Conventionally, the backing material is a flexible sheet.

Suitable flexible backing sheets include those formed of flexible composition as well as sheets of woven fabric and impregnated felted fibers. Any of the thermo plastic or elastomer resinous compositions which can be calendered or pressed to form a flexible sheet can be used to form backing sheets. Such resins as butadiene-styrene copolymer, polymerized chloroprene, polyvinyl chloride, polyvinyl acetate, vinyl chloride-vinyl acetate copolymer and the like can be compounded with plasticizers and fillers and sheeted to form a flexible sheet. In some cases, scrap and degraded resinous compositions can be salvaged by forming them into sheets and used as backing sheets in producing products in accordance with the invention.

As indicated, suitable backing sheets also include woven fabrics formed of such fibers as cotton, wool and various synthetic fibers. Where loosely woven fabrics, such as burlap are used, the fabric can be sized to prevent passage of the coating composition through the openings between the fibers.

It has been found that felted cellulose or asbestos fibrous sheets impregnated with a water-resistant and strengthening saturant yield particularly desirable backing sheets for the production of products in accordance with the invention since they are low in cost and yet are flexible and strong. The sources of cellulose can include cotton or other rags, wood pulp, paper boxes or mixtures thereof in any proportion. In addition, fillers such as wood flour can be used. A slurry of fibrous material in water is formed into a sheet using any of the techniques conventionally employed in the manufacture of paper. For example, sheet formulation can take place on a Fourdrinier or cylinder sheet-forming machine. The fibrous sheet so prepared is then dried. In addition to cellulose and asbestos, other fibers can be used including synthetic fibers and those of mineral and animal origin.

The particular impregnant or saturant chosen must not only be capable of imparting strength and water resistance to the sheet of felted fibers, but must also meet other requirements as to its physical and chemical behavior at the high processing temperatures. The coating composition applied to the backing in accordance with the invention must be heated to temperatures as high as 300 to 400° F. in order to fuse the resin and expand the composition into a foam. Thus, the impregnant chosen must be stable at these temperatures. The impregnant should also be substantialy free of any components which are volatile at these temperatures and it also must not soften to such an extent as to exude from the sheet. In addition, the saturant should not be subject to appreciable detrimental chemical changes such as oxidaion.

Suitable resins for use as impregnants include vinyl resins, such as copolymers of vinyl chloride, polymerized acrylic and methacrylic acids and their polymerized derivatives, polyethylene, polystyrene, butadiene-styrene copolymer, butadiene-acrylonitrile copolymer, natural rubber, polymerized chloroprene and the like. Thermosetting resins which under the influence of heat cure by polymerizing and cross-linking can also be used as impregnants. Such resins as phenolic resins, polyesters, oleoresins such as drying oils and the like, isocyanates and polyurethanes and the like are suitable. Such resins can be incorporated into a felted fibrous sheet by impregnation of the finished sheet with an emulsion or solution of the resin followed by drying of the sheet to remove the solvent. Alternately, the resin can be added in fine particles to the fiber furnish prior to sheet formation either as solid particles of resin or as an emulsion in water or other emulsifying vehicle.

Some resin impregnants which produce a felted sheet with excellent physical properties are not compatible with the coating composition to be applied. This may result in poor adhesion of the coatings to the base. In such cases, it is desirable to size the surface of the impregnated felt sheet to which the foamable composition is to be applied with a thin coating of material which has good adhesion to both the felt impregnant and the foamable composition. Where a plasticized polyvinyl chloride polymer foam is used, excellent results have been obtained over a wide variety of felt impregnants using a size of acrylic polymer latex. A mixture of equal parts of a soft acrylic polymer latex and a hard acrylic polymer latex has been found particularly effective in aiding adhesion without causing sticking of the sized surface to the rolls during the processing. The coating is effective in small amounts, an application of only 0.02 pound dry weight per square yard being sufficient to obtain the improvements. Other vinyl resins can also be used, depending upon the type of felt impregnant and foam applied thereon. A butadiene-acrylonitrile polymer latex either alone or in combination with hard resin emulsions is effective.

In accordance with the preferred procedure of the invention, a coating of foamable composition is applied and a wear layer coat of resinous composition is also applied. The resinous binder is preferably one that is coalesced or fused into a continuous film by the application of heat. The dispersion medium can be water in the case of an aqueous latex, or an organic solvent, but is preferably a fluid plasticizer for the resin used. Such a dispersion of resin in a plasticizer is conventionally termed a plastisol. A plastisol has appreciable fluidity at normal room temperature but is converted by heat into a flexible, tough thermoplastic mass. This ultimate result is brought about by the process of fusion wherein the resin becomes plasticized and completely solvated by the plasticizer. Plastisols are preferred for the foamable composition since it is unnecessary to remove large volumes of carrier as is necessary with water and organic solvent carries. Organosols are preferred for the wear layer since they contain less plasticizer and are, as a general rule, less subject to staining.

The preferred and most widely used resins for coating compositions are polymers of vinyl chloride. The vinyl chloride polymers can either be simple, unmixed homopolymers of vinyl chloride or copolymers, terpolymers or the like thereof in which the essential polymeric structure of polyvinyl chloride is interspersed at intervals with the residues of other ethylenically unsaturated compounds polymerized therewith. The essential properties of the polymeric structure of polyvinyl chloride will be retained if not more than 40 percent of the extraneous comonomer is copolymerized therein. Suitable extraneous comonomers include, for instance, vinyl esters on the order of vinyl bromide, vinyl fluoride, vinyl acetate, vinyl chloroacetate, vinyl butyrate, other fatty acid vinyl esters, vinyl alkyl sulfonates, trichloroethylene and the like; vinyl ethers such as vinyl ethyl ether, vinyl isopropyl ether, vinyl chloroethyl ether and the like; cyclic unsaturated compounds such as styrene, the mono- and polychlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate and the like; vinylidene compounds on the order of vinylidene chloride, vinylidene bromide, vinylidene fluorochloride and the like; unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene, 2,3-dimethyl-butadiene-1,3-piperylene, divinyl ketone and the like.

Resins adaptable for use in formulating vinyl plastisols are commonly referred to as dispersion grade resins. Such resins are available having particle sizes of from 0.02 to about 2 microns in contrast to calender grade vinyl resins which are available in particles ranging up to 35 microns in size. Dispersion grade resins are usually of higher molecular weight than calender grade resins and have particle surfaces of a hard, horny nature.

Polymers of vinyl chloride having specific viscosities above about 0.25 and preferably between 0.30 and 0.70 as measured in a solution of 0.4 gram of resin in 100 milliliters of nitrobenzene at 30° C. are particularly effective (ASTM D-1243-60 Method B). In the determination of specific viscosities, the sample of resin in nitrobenzene solution maintained at a temperature of 30° C. is allowed to flow between two calibrated marks in a pipette and the time required is recorded. This time is compared with the time required for a control of pure nitrobenzene solvent to pass between the same two marks, also at a temperature of 30° C. The specific viscosity is determined as the sample flow time divided by the control flow time, minus 1. The specific viscosity is an effective measure of relative molecular weight of the polymer, the higher the specific viscosity the higher being the molecular weight.

As indicated, this invention relates to the incorporating in the foamable vinyl chloride polymer composition a limited amount of synthetic rubber polymer. Any of synthetic rubber polymers can be utilized which are compatible with polyvinyl chloride. These rubbers can be defined as polymers of aliphatic, conjugated diolefins and copolymers of aliphatic, conjugated diolefins with other copolymerizable monomeric compounds. Typical of the rubbers are the rubber-like homopolymers and copolymers of butadiene and styrene containing about 50% to about 70% butadiene, the nitrile rubbers which are copolymers of butadiene and acrylonitrile containing about 55% to about 80% butadiene, and Neoprene which is a polymer of 2-chlorobutadiene-1,3. Butyl rubber (11R) is also suitable and is made by copolymerization of an iso-olefin, usually isobutylene, with a minor proportion of a multi-olefinic unsaturate having from 1 to 14 carbon atoms per molecule. This iso-olefin used generally has from 4 to 7 carbon atoms, and such isomono-olefins, as isobutylene or ethyl methyl ethylene, are preferred. The multi-olefinic unsaturate usually is an aliphatic conjugated diolefin having from 4 to 6 carbon atoms, and is preferably isoprene or butadiene. Other suitable diolefins are, for example, piperylene; 2,3-dimethyl butadiene-1,3; 1-dimethyl butadiene-1,3; 1,3-dimethyl butadiene-1,3; 1,3-ethylbutadiene-1,3, and 1,4-dimethyl butadiene-1,3. It is essential to the invention that the synthetic rubber be present in about 3 to about 15 parts and preferably 5 to 10 parts of rubber for each 100 parts of vinyl chloride polymer. These rubbers are preferably incorporated in the foamable plastisol as solutions in either organic solvents or plasticizer-solvent blends. The solution can be prepared by milling the rubber and mixing in a blender. In order to obtain the best cellular structure, it is essential to subject the foamable plastisol composition to a preliminary heating to remove all of the solvent prior to fusion.

For the product of this invention to be essentially free from indentation or be substantially free from permanent indentation, it is desirable for the permanent indentation to be less than about 0.015 inch after seven days following the removal of a load of 300 pounds per square inch applied with a ¼ inch diameter rod for a 72-hour period. This depth of permanent indentation would include any indentation placed in the base web, if present.

In the formulation of coating compositions for use in the invention, the resin is uniformly dispersed in a mass of fluid plasticizer in a plastisol or with plasticizer and organic solvent with an organosol. The fluidity of plastisols is influenced in part by the particular resin selected, the plasticizer utilized, as well as the ratio of plasticizer to resin. Plastisols become less fluid as the ratio of plasticizer to resin is reduced. Coating compositions for use in the invention contain from about 45 to about 80 parts plasticizer per 100 parts resin with a range of about 60 to about 70 parts plasticizer per 100 parts being particularly effective for the foamable coating. The plasticizer level of the wear layer composition can be as low as 28 parts per 100 parts of resin up to about 80 parts or even higher, with 30 to 60 parts of plasticizer per 100 parts of resin being preferred. The viscosity of the compositions can be reduced by the addition of a volatile diluent. Plastisols usually contain less than 5 parts per 100 parts resin of diluents. Useful diluents include aliphatic hydrocarbons, mineral spirits, petroleum solvents such as V. M. and P. Naphtha (boiling range of 190–275° F.) and the like.

The selection of the plasticizer is important in determining the strength and flexibility of the coating and also in influencing the viscosity, stain resistance and the foaming characteristics of the composition. Esters of straight and branched chain alcohols with aliphatic acids impart low viscosity and good viscosity stability. Typical plasticizers of this type include dibutyl sebacate, dioctyl sebacate, dioctyl adipate, didecyl adipate, dioctyl azelate, triethylene glycol di (2-ethylhexanoate), diethylene glycol dipelargonate, triethylene glycol dicaprylate and the like. Plasticizers of the aromatic type, such as esters of aliphatic alcohols and aromatic acids or aromatic alcohols and aliphatic acids or aromatic alcohols and aromatic acids are desirable in that they impart good foaming characteristics to a plastisol, although the use of highly aromatic plasticizers is limited by their tendency to yield plastisols of high viscosity. Typical plasticizers of this type include dibutyl phthalate, dicapryl phthalate, dioctyl phthalate, dibutoxy ethyl phthalate, dipropylene glycol dibenzoate, butyl benzyl sebacate, butyl benzyl phthalate, dibenzyl sebacate, dibenzyl phthalate and the like. Other types of plasticizers, such as esters of inorganic acids, including tricresyl phosphate, octyl diphenyl phosphate and the like, alkyd derivatives of rosin, chlorinated paraffin, high molecular weight hydrocarbon condensates and the like can also be used. The plasticizer or blend of plasticizers is chosen to yield a composition of the desired viscosity and/or foaming characteristics. In addition, the plasticizer should preferably have a low vapor pressure at the temperatures required to fuse the resin. A vapor pressure of two millimeters of mercury or less at 400° F. is satisfactory.

Minor amounts of stabilizers are usually incorporated in the coating compositions to reduce the effects of degradation by light and heat. Suitable light stabilizers include resorcinol disalicylate, resorcinol dibenzoate, phenyl phthalate, phenyl benzoate, o-tolyl benzoate, eugenol, guaiacol, o-nitrophenol, o-nitraniline, triethylene glycol salicylate, and organic phosphates and other complexes of such metals as barium, cadmium, strontium, lead, tin and the like. Suitable heat stabilizers include sulfides and sulfites of aluminum, silver, calcium, cadmium, magnesium, cerium, sodium, strontium and the like, glycerine, leucine, elanine, o- and p-amino benzoic and sulfanilic acids, hexamethylene tetramine, weak acid radicals including oleates, recinoleates, abietates, salicylates and the like. Normally, the compositions contain about 0.5 to about 5 parts stabilizer per 100 parts resin. Care should be exercised in the selection of a stabilizer since some types will catalyze the decomposition of the blowing agent and alter the decomposition temperature range.

The coating compositions can contain pigments in accordance with the particular color desired. Where a multicolored decorative effect is created in accordance with the invention by printing, separate batches of printing composition for each of the colors desired are needed. Any of the organic and inorganic pigments well-known in the art for pigmenting compositions can be used. Normally, from about 0.5 to about 5 parts pigments per 100 parts resin are used.

The foamable compositions contain, addition, an effective amount of blowing agent. The larger the amount of blowing agent within practical limits used the greater is the expansion of the foam. Foam densities of from about to about pounds per cubit foot can be readily attained. 12 to about 40 pounds per cubic foot can be readily attained. Such results are attainable with from about 1 to about 20 parts blowing agent per 100 parts resin. About 2 to 10 parts blowing agent per 100 parts resin is particularly effective for the production of foams of a density which are most desirable for use in producing surface coverings in accordance with the invention. The amount of blowing agent will depend in large measure on the efficiency of the agent.

Complex organic compounds which, when heated, decompose to yield an inert gas and have residues which are compatible with the resin used in the compositions are preferred as blowing agents. Such materials have the property of decomposition over narrow temperature range which is particularly desirable for obtaining a good foam structure. Compounds having the $>N-N<$ and $$-N=N-$$

linkages decompose at elevated temperatures to yield a gas mixture high in nitrogen. Typical compounds include substituted nitroso compounds, substituted hydrazides, substituted azo compounds and the like, such as are tabulated in Table 1:

TABLE 1

| Blowing agent | Decomposition temperature, ° F. |
|---|---|
| Dinitrosopentamethylenetetramine | 355–375 |
| Azodicarbonamide ($NH_2-\overset{\overset{O}{\|}}{C}-N=N-\overset{\overset{O}{\|}}{C}-NH_2$) | 325–400 |
| p,p'-Oxybis (benzene sulfonyl hydrazide) | 300–340 |
| Azobisisobutyronitrile | 220–250 |
| N,N'-dimethyl-N,N'-dinitrosoterephthalamide | 190–300 |

The decomposition temperature can vary depending on the particular composition. Catalyst can also be added to accelerate the decomposition.

Blowing agents for use in the invention should decompose at an effective rate at a temperature below the decomposition temperature of the resin uesd, but preferably at or above the elastomeric point of the resin composition. A layer of resinous foam has heat insulating properties with the result that fusion of the prefoamed layer is very difficult and extremely slow. Therefore, in the case of compositions formulated with the preferred vinyl chloride polymers, a blowing agent decomposing between about 300 to 450° F. gives the best results. The minimum initial decomposition temperature must be sufficiently high that no premature gas evolution occurs during mixing of the composition, coating operations, and particularly the gelling step. In the event the coating is to be fused before the wear layer is applied, then it is necessary to use a blowing agent which decomposes above the fusion temperature of the resin. In general, vinyl chloride polymer compositions attain body through partial gellation when heated to about 200 F. Thus, the minimum decomposition temperature should be about 200° F. or higher.

After the first coating is applied, the coating is heated to gel the composition. In this specification and claims, the term "gel" includes both the partial (at least the elastomeric point) and complete solvation of the resin or resins with the plasticizer. The heating is limited as to the time and temperature to prevent the decomposition of the blowing agent in the composition. When using the preferred polyvinyl chloride composition, the temperature of the composition is preferably raised to about 240° F. to about 275° F. Generally, the air temperature in the oven would be slightly higher to have the coating reach the desired temperature in a reasonable time.

The degree of foaming of a typical plastisol formulation using different concentration of blowing agent is shown in Table 2:

TABLE 2

| Parts azodicarbonamide per 100 parts resin | Ratio of foam thickness to original thickness | Density, lbs. per cu. ft. |
|---|---|---|
| 0.0 | 1/1 | 80 |
| 0.1 | 1.33/1 | 60 |
| 0.5 | 2/1 | 40 |
| 1.0 | 3/1 | 27 |
| 2.0 | 4.5/1 | 17.5 |
| 3.0 | 6.5/1 | 12.3 |
| 5.0 | 9.3/1 | 8.6 |

It has been found that density of from about 15 to 50 pounds per cubic foot produces the most useful products.

The thickness of the foam layer will depend in large measure on the final product desired. As a general rule, foam thicknesses of about .005 to about 0.150 inch are particularly useful. The thickness of the wear layer, if utilized, can also vary widely depending on the desired wear resistance of the final product. A thickness of about 0.008 to about 0.020 inch has been found to meet most of the normal uses of the product. Highly decorative products can be produced by printing a decorative design on the product. The decorative design can be printed on the gelled foamable coating or on the wear layer. If it is between the wear layer and the foam, the wear layer will have to be substantially transparent so that is is visible. The design can also be printed on the surface of the product or a film can be printed and then laminated to the foam or foamable layer.

After partial gelling, the temperature of the composition should be reduced so that wear layer coating composition will not be affected during its application. After cooling and the application of the wear layer, the composition is heated to a temperature sufficient to fuse the resins and decompose the blowing agent. The temperature of the entire mass of composition upon the web must attain the fusion temperature of the resin in order that a product of satisfactory strength can be attained. In addition, the entire mass of foamable composition must be heated to a point where the blowing agent is decomposed. Where a preferred high temperature blowing agent is used, blowing does not occur until the resinous compositions have been completely fused.

If volatile diluents are used to reduced the viscosity of the coating composition, care must be taken that they are essentially completely removed from the film prior to fusion and foaming. If they are not removed, poor cell structure and blister formation will result. This removal can be accomplished by heating the composition at a temperature substantially below the fusion temperature and minimum decomposition temperature of the foaming agent for sufficient time to remove the volatile material. For example, if 5 percent of V. M. and P. Naphtha (boiling range 190–275° F.) is used, heating at 300° F. for approximately three minutes will remove sufficient material so that fusion and foaming at 375° F. oven temperature can be accomplished with good cell structure and freedom from blisters.

Heating in order to effect fusion and foaming can be brought about under infrared heat lamps as shown in the drawing or other types of heating such as forced hot air oven or dielectric heating units can be used. In some instances, it is desirable to heat the web from both sides of offset the insulating effect of the foam.

The foamed and fused product after leaving the heating oven is permitted to cool. Cooling is particularly important since any premature handling of the product immediately after foaming might cause partial collapse and distortion of the foam structure. Cooling can be brought about by mere exposure of the product of the atmosphere; thus, the speed of motion of the backing along the processing apparatus can be adjusted so that the product is given sufficient time to cool. Alternately, cooling can be accelerated by blowing jets of cooled air upon the fused and foamed composition or by means of fine sprays of water upon the fused and foamed composition.

After being cooled, the product is withdrawn from the processing apparatus. It can be used in the form of a sheet as produced or can be cut into tiles or other appropriate shapes depending on the particular use to which the product is to be put. Products produced in accordance with the invention have the characteristics of excellent wear and soil resistance because of the solid layer and excellent resiliency in view of the foamed layer. The product of this invention finds many other uses such as packaging material for decorative packages, decorative displays, interiors for automobiles and the like. Many other uses will occur to those skilled in the art.

Table 3 gives the preferred temperature and time relationship using the preferred polyvinyl chloride resin:

TABLE 3

| Film condition [1] | Resin temperature (° F.) | Oven temperature (° F.) circulating air | Exposure time range (seconds) |
|---|---|---|---|
| Elastomeric point | 240–300 | 250–400 | 10–300 |
| Fused | 300–375 | 350–450 | 60–240 |
| Blown | 340–400 | 350–450 | 60–240 |

[1] 0.014 inch plastisol on 0.25 inch cellulosic felt base impregnated with 20% polyvinyl acetate and 10% petroleum hydrocarbon.

The time required to reach the elastomeric point will depend in part on the film thickness and particular base as shown in Table 4:

TABLE 4

| Base | Film thickness (inch) | Time/temperature (second/° F.) |
|---|---|---|
| A[1] | 0.008 | 45/300 |
| A | 0.014 | 60/300 |
| B[2] | 0.014 | 90/300 |

[1] Base A is a cellulosic felt of 0.025 inch thickness impregnated with 30% vinyl acetate homopolymer.
[2] Base B is a cellulosic felt of 0.043 inch thickness impregnated with synthetic rubber and urea-formaldehyde.

The following examples are given for purposes of illustration:

Examples I to VII are typical foamable compositions:

Example I

A foamable plastisol was formulated by grinding the following ingredients on a conventional three-roll mill:

| | Parts |
|---|---|
| Polyvinyl chloride (dispersion grade high molecular weight) | 45 |
| Polyvinyl chloride (dispersion grade medium molecular weight) | 45 |
| Copolymer of butadiene (76.5%) and styrene (23.5%) (SBR) | 10 |
| Aryl modified phthalate ester plasticizer | 48.5 |
| Petroleum hydrocarbon condensate | 10 |
| V. M. & P. Naphtha | 20 |
| Dibasic lead phosphite | 1.5 |
| Finely divided titanium dioxide | 8.5 |
| Azodicarbonamide blowing agent | 2.4 |

Example II

The following ingredients in the proportions indicated were ground on a three-roll mill to form a foamable plastisol:

| | Parts |
|---|---|
| Polyvinyl chloride (dispersion grade) | 90 |
| Polymer of 2-chlorobutadiene-1,3 (neoprene) | 10 |
| Petroleum hydrocarbon condensate [1] | 18 |
| Aryl modified phthalate ester plasticizer | 52 |
| V. M. & P. Naphtha | 25 |
| Pigment | 3 |
| Stabilizers | 4 |
| Azodicarbonamide | 2.0 |

[1] Conoco 300—Continental Oil Company, Ponca City, Okla.

Example III

The following ingredients were ground on a three-roll mill to form a foamable plastisol:

| | Parts |
|---|---|
| Polyvinyl chloride (dispersion grade) | 95 |
| Cis-1,4-polyisoprene | 5 |
| Petroleum hydrocarbon condensate [1] | 27 |
| Butyl benzyl phthalate | 43 |
| Pigment | 3 |
| Stabilizers | 4 |
| Azodicarbonamide blowing agent | 1 |
| V. M. and P Naphtha (boiling range 190–275° F.) | 10 |

[1] Conoco 300—Continental Oil Company.

Example IV

| | Parts |
|---|---|
| Polyvinyl chloride (dispersion grade—high molecular weight) | 31.5 |
| Polyvinyl chloride (dispersion grade—medium molecular weight) | 31.5 |
| Polyvinyl chloride (large particle size blending resin) | 27.0 |
| Copolymer of butadiene and styrene (SBR) | 10 |
| Butyl benzyl phthalate | 48.5 |
| V. M. & P. Naphtha | 20 |
| Petroleum hydrocarbon condensate [1] | 10 |
| Dibasic lead phosphite | 1.3 |
| Pigment (TiO$_2$) | 8.5 |
| N,N'-dimethyl-N,N'dinitroso terephthalamide blowing agent | 5 |

[1] Conoco 300.

The foamable plastisol was prepared on a three-roll mill.

Example V

The following ingredients in the proportions indicated were ground on a three-roll mill to form a foamable plastisol:

| | Parts |
|---|---|
| Polyvinyl chloride (dispersion grade) | 85 |
| Polybutadiene | 5 |
| Petroleum hydrocarbon condensate [1] | 18 |
| Aryl modified phthalate ester plasticizer | 52 |
| Pigment | 3 |
| Stabilizers | 4 |
| Azodicarbonamide blowing agent | 1.0 |
| V. M. & P. Naphtha (boiling range 190–275°) | 15 |

[1] Conoco 300.

Example VI

A foamable plastisol was prepared having the following composition:

| | Parts |
|---|---|
| Polyvinyl chloride (high molecular weight) | 95 |
| Polyvinyl chloride (low molecular weight) | 95 |
| Copolymer of butadiene and styrene (SBR) | 10 |
| Azodiformamide | 3 |
| Pigment (TiO$_2$) | 8.5 |
| Dibasic lead phosphite | 1.7 |
| Aryl modified phthalate ester plasticizer | 100 |
| V. M. & P. Naphtha (boiling range 190–275° F.) | 20 |

Example VII

The following ingredients in the proportions indicated were ground on a three-roll mill to form a plastisol:

| | Parts |
|---|---|
| Polyvinyl chloride (dispersion grade high molecular weight) | 225 |
| Polyvinyl chloride (dispersion grade medium molecular weight) | 225 |
| Petroleum hydrocarbon condensate [1] | 50 |
| Aryl modified phthalate ester plasticizer | 143 |
| Dibasic lead phosphite (60% in diocetyl phthalate) | 8.6 |
| Pigment (50% in dioctyl phthalate) | 43.5 |
| Azodicarbonamide (50% in dioctyl phthalate) | 10.0 |
| Copolymer of butadiene and styrene (SBR) | 50 |
| Dioctyl phthalate | 100 |
| V. M. & P. Naphtha | 76 |

[1] Conoco 300.

Examples VIII and IX are typical wear layer compositions:

Example VIII

A transparent wear layer composition was prepared by mixing the following ingredients:

| | Parts |
|---|---|
| Polyvinyl chloride (dispersion grade) | 100 |
| Aryl modified phthalate ester plasticizer | 38 |
| Petroleum hydrocarbon condensate [1] | 7 |
| Stabilizer | 3 |
| Epoxidized ester | 5 |
| Viscosity depressant | 0.4 |
| V. M. & P. Naphtha | 2.0 |

[1] Conoco 300.

The plastisol had a viscosiety of 2,500 centipoises as measured with a Brookfield viscometer using a No. 6 spindle at 10 r.p.m. It was suitable for coating or printing by the flat bed method.

Example IX

A transparent organosol was prepared by mixing the following ingredients:

| | Parts |
|---|---|
| Vinyl chloride polymer dispersion grade) | 100 |
| Dioctyl phthalate | 17 |
| Tricresyl phosphate | 8.5 |
| Polyester plasticizer | 8.5 |
| Stabilizer | 2.0 |
| Mineral spirits | 5 |

Example X

A size coat is prepared having the following formulation:

| | Parts |
|---|---|
| Polyvinyl chloride latex (preplasticized) | 53 |
| Carboxy vinyl polymer (thickener 2% in water) | 35 |
| Water | 12 |

Ammonia to raise pH to 7–8.

Example XI

A sheet of felted cellulose fibers (.045 inch thick) was produced containing 25 percent by weight of the fibers of polyvinyl acetate dispersed in fine particulate form at junctions of fibers within the sheet. The size coat of Example X was applied to the surface of the sheet at a thickness of about 0.001 inch and dried. The foamable plastisol composition of Example VI was coated on the surface of the felt sheet by means of a reverse roll coater to form a coating having a thickness of 0.010 inch. The coating was then subjected to heat for five minutes at 200° F. to remove the solvent and then at 300° F. for a period of three minutes to gel the coating without decomposing the blowing agent. A four-color pattern was printed by conventional rotogravure printing technique utilizing conventional printing inks on the surface of the gelled coating. After the inks had dried, the composition of Example VIII was applied by a reverse roll coater over the printing to form a coating having a thickness of 14 mils. The sheet was then passed through an oven maintained at 400° F. with a residence time of four minutes, thereby fusing the resin and obtaining maximum expansion of the composition to produce a foamed product. The foamable composition expanded to yield a product having a foam thickness of about 25 mils with a solid transparent wear layer. The product had excellent indent recovery.

Table A shows the results of tests made on various compositions in order to demonstrate the high indent recovery of the products of the invention. Various foamable compositions were prepared utilizing the general formula of Example VI except that the copolymer of butadiene and styrene was replaced by an equivalent amount of vinyl chloride resin, the naphtha solvent was utilized in the amount indicated by addition with the rubber, and the aryl modified phthalate ester plasticizer was replaced by dioctyl phthalate in the amounts indicated. The various amounts of rubber were added as a direct replacement of the equivalent amount of polyvinyl chloride. The rubber was first formed into a solution by mixing with dioctyl phthalate and the naphtha solvent and then this solution added to the remaining ingredients of the composition. The foamable composition was heated for five minutes at 200° F. to remove the solvent and then for three minutes at 300° F. to gel the composition. A wear layer of 0.014 inch in thickness having the composition of Example VIII was applied to the surface of the gelled foamable composition. The sample was then fused at 400° F. to obtain optimum expansion of the foam. The samples, after cooling, were tested for indent recovery by subjecting them to static loads of 300 pounds per square inch for seventy-two hours. The load was then removed and the depth of the indent was measured. Additional measurements of the indent were taken at twenty-four hour intervals for a period of seven days.

7. A resilient cellular sheet comprising a first layer of cellular foamed plasticized thermoplastic vinyl chloride polymer composition having a thickness of from about 0.020 to about 0.100 inch containing about 45 to about 80 parts of plasticizer per 100 parts of vinyl chloride polymer and about 3 to about 15 parts per 100 parts of vinyl chloride polymer of a synthetic rubber and a second layer of about 0.008 to about 0.020 inch in thickness of a non-cellular vinyl chloride polymer composition laminated to one surface of said first layer.

8. The product of claim 7 wherein a felted fibrous sheet is laminated to the opposite surface of said cellular layer.

9. The product of claim 7 wherein said foamed layer has a density of about 12 to about 40 pounds per cubic foot.

10. The product of claim 7 wherein said synthetic rubber is polymerized chloroprene.

TABLE A

| Example No. | Composition of rubber solution | Parts per hundred parts of Vinyl Resin | | | Foam thickness (inch) | Foam thickness/ gel thickness | Compression [1] (inch) | Indent [2] (inch) | Indent [3] (inch) | Indent [4] (inch) |
|---|---|---|---|---|---|---|---|---|---|---|
| | | Synthetic rubber | Dioctyl phthalate | Naphtha | | | | | | |
| XII | | | | | .060 | 2.38 | .045 | .039 | .037 | .036 |
| XIII | | | | | .060 | 3.34 | .061 | .049 | .044 | .038 |
| XIV | 15% Plioflex 1502 [5] | 10 | 30 | 26.8 | .090 | 3.24 | .061 | .020 | .018 | .014 |
| XV | 45% Dioctyl phthalate | 16.2 | 48.7 | 43 | .073 | 2.6 | .069 | .012 | .009 | .007 |
| XVI | | 5 | 15 | 13.4 | .090 | 3.1 | .068 | .020 | .018 | .015 |
| XVII | 40% Naphtha | 5 | 15 | 13.4 | .088 | 2.64 | .072 | .020 | .017 | .015 |
| XVIII | 20% Plioflex 1502 | 5 | 11 | 9 | .0725 | 2.42 | .051 | .017 | .015 | .012 |
| XIX | 44% Dioctyl phthalate | 5 | 11 | 9 | .092 | 3.1 | .064 | .020 | .017 | .014 |
| XX | | 10 | 22 | 18 | .080 | 2.5 | .051 | .018 | .015 | .012 |
| XXI | 36% Naphtha | 10 | 22 | 18 | .083 | 2.8 | .055 | .017 | .014 | .011 |
| XXII | | 15 | 33 | 27 | .074 | 2.3 | .045 | .016 | .013 | .011 |
| XXIII | | 15 | 33 | 27 | .085 | 2.8 | .061 | .019 | .016 | .012 |
| XXIV | 22.2% Natsyn [6] | 5 | 10 | 7.6 | .070 | 2.5 | .055 | .034 | .019 | .014 |
| XXV | 44.4% Dioctyl phthalate, 33.4% Naphtha. | 15 | 30 | 23 | .070 | 2.5 | .036 | .027 | .019 | .014 |
| XXVI | 20% Neoprene WD [7] | 10 | 20 | 20 | .0653 | 3.8 | .056 | .015 | .013 | .009 |
| XXVII | 40% Dioctyl phthalate, 40% Naphtha. | 15 | 30 | 30 | .070 | 2.92 | .061 | .018 | .015 | .011 |
| XXVIII | 15% Plioflex 1502 | 5 | 18.4 | 10 | .080 | 2.86 | .076 | .020 | .015 | .014 |
| XXIX | 55% Dioctyl phthalate | 10 | 36.8 | 20 | .080 | 2.70 | .063 | .018 | .014 | .012 |
| XXX | | 5 | 18.4 | 10 | .077 | 2.76 | .059 | .021 | .017 | .015 |
| XXXI | 30% Naphtha | 10 | 36.8 | 20 | .070 | 2.91 | .056 | .019 | .013 | .011 |
| XXXII | 15% Plioflex 1502 | 5 | 26 | 8.3 | .075 | 2.6 | .058 | .016 | .013 | .011 |
| XXXIII | 60% Dioctyl phthalate | 10 | 52 | 16.6 | .075 | 2.7 | .058 | .017 | .013 | .009 |
| XXXIV | | 5 | 26 | 8.3 | .070 | 3.2 | .054 | .017 | .013 | .010 |
| XXXV | 25% Naphtha | 10 | 52 | 16.6 | .080 | 2.5 | .054 | .018 | .015 | .012 |

[1] Inches of compression from load of 300 lbs. p.s.i. for 72 hours.
[2] Inches of residual indent after 24-hour recovery.
[3] Inches of residual indent after 48-hour recovery.
[4] Inches of residual indent after 7-day recovery.
[5] Copolymer of 23.5% styrene and 76.5% butadiene.
[6] Polymer of cis-1,4-isoprene.
[7] Polymer of chloroprene.

What is claimed is:

1. In a method of producing a resilient sheet having a solid resinous layer bonded to a resilient cellular foam layer and having excellent indent recovery which comprises applying a first coating of a thermoplastic vinyl chloride polymer composition to one surface of a web, heating said coating to at least partially gel the composition, applying a second coatnig of a thermoplastic vinyl polymer composition to cover said first coating, heating said first and second coatings to fuse the compositions and decompose the blowing agent thereby forming said resilient sheet and thereafter cooling the sheet, the improvement which comprises utilizing as one of said coatings a composition comprising about 28 to about 50 parts of plasticizer per 100 parts of vinyl polymer and as the other coating a composition comprising an effective amount of blowing agent, about 3 to about 15 parts per 100 parts of vinyl chloride polymer of a synthetic rubber and about 45 to about 80 parts of plasticizer per 100 parts of vinyl chloride polymer.

2. The process of claim 1 wherein said synthetic rubber is a copolymer of butadiene and styrene.

3. The process of claim 1 wherein said synthetic rubber is cis-1,4-polyisoprene.

4. The process of claim 1 wherein said synthetic rubber is polymerized chloroprene.

5. The process of claim 1 wherein said synthetic rubber is polybutadiene.

6. The process of claim 1 wherein the non-cellular coating has a thickness of about 0.008 inch to about 0.020 inch.

11. The product of claim 7 wherein said synthetic rubber is a copolymer of butadiene and styrene.

12. The product of claim 7 wherein said synthetic rubber is cis-1,4-polyisoprene.

13. The product of claim 7 wherein said synthetic rubber is polybutadiene.

14. A resilient sheet which comprises a layer of cellular foamed plasticized thermoplastic vinyl chloride polymer composition and a layer of about 0.008 to about 0.020 inch in thickness of a non-cellular plasticized vinyl chloride polymer composition bonded to one surface of said cellular layer, said cellular layer containing about 45 to about 80 parts of plasticizer and about 5 to about 10 parts per 100 parts of vinyl chloride polymer of synthetic rubber.

15. The resilient sheet of claim 14 wherein the opposite surface of said cellular layer is laminated to a felted fibrous sheet.

References Cited

UNITED STATES PATENTS 2,918,702  12/1959  Wetterau _____ 156—78
2,964,799  12/1960  Roggi et al. _____ 161—160

ROBERT F. BURNETT, *Primary Examiner.*

W. J. VAN BALEN, *Assistant Examiner.*

U.S. Cl. X.R.

117—72; 260—2.5; 161—251, 256; 156—79